(12) United States Patent
Begley

(10) Patent No.: US 6,487,158 B2
(45) Date of Patent: Nov. 26, 2002

(54) COVER MEMBER AND METHOD FOR AN OPTICAL DISC DRIVE

(75) Inventor: Paul V. Begley, Loveland, CO (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/352,026

(22) Filed: Jul. 14, 1999

(65) Prior Publication Data

US 2002/0067675 A1 Jun. 6, 2002

(51) Int. Cl.[7] .................................................. G11B 7/00
(52) U.S. Cl. ..................................................... 369/75.1
(58) Field of Search ........................... 369/71, 72, 77.2, 369/75.1, 75.2, 292

(56) References Cited

U.S. PATENT DOCUMENTS

| 5,111,350 A | 5/1992 | Carey et al. ............. 360/99.06 |
| 5,245,601 A | 9/1993 | Hake ............................ 369/72 |
| 5,297,122 A | 3/1994 | Christie ....................... 369/13 |
| 5,615,196 A | 3/1997 | Kato ............................ 369/71 |
| 5,946,291 A | 8/1999 | d'Alayer de Costemore d'Arc ........ 369/292 |
| 5,995,467 A | 11/1999 | Ohyama et al. ............... 369/71 |

Primary Examiner—Thang V. Tran

(57) ABSTRACT

An optical disc drive is disclosed wherein the optical disc drive has a cover member to protect an optical pickup unit located within the optical disc drive. The cover member is movably associated with the optical disc drive and has a first operating position and a second operating position. The position of the cover member dictates whether the optical disc drive is in a non-operative condition or an operative condition. The non-operative condition is a condition in which the cover member is positioned at the first operating position, adjacent the optical pickup unit. The operative condition is a condition in which the cover member is positioned at the second operating position, spaced from the first position.

11 Claims, 5 Drawing Sheets

COVER MEMBER AND METHOD FOR AN OPTICAL DISC DRIVE

TECHNICAL FIELD OF THE INVENTION

The present invention relates to optical disc drives and, more particularly, to a mechanism and method for securing and covering the optical pickup unit of an optical disc drive when the optical disc drive is not in use.

BACKGROUND OF THE INVENTION

Optical disc drives are devices that use light to translate information stored on an optical disc to a machine-readable format, e.g., binary data. Examples of optical disc drives are known in the art as compact disc drives (often referred to simply as CDS) and digital versatile disc drives (often referred to simply as DVDs). Some optical disc drives have the additional capability of being able to write data onto an optical disc by the use of a light source, e.g., a laser. Optical disc drives are being used in various applications including music and video playing and recording devices and computer data storage devices. As these applications become more portable, the optical disc drives also need to become more portable. For example, they must be compact and able to withstand the shock and vibration to which portable applications are commonly subject.

The optical disc is a round, flat device similar to a record. Digital data is stored in spiral tracks on the optical disc in much the same way analog audio information is stored in a spiral groove on a record. The data stored on an optical disc, however, is much more compact than the audio information stored on a record. For example, the radial distance between tracks on an optical disc is typically approximately 1.6 microns for a compact disc and less for a digital versatile disc. The data on the optical disc consists of a plurality of optical transitions that are detected or "read" by the optical disc drive as the optical disc spins. The optical disc may spin at varying speeds of up to 4000 rpm as data is being read from or written to the optical disc.

A schematic diagram of a side view of a conventional optical disc drive 400 is illustrated in FIG. 1. The optical disc drive 400 is illustrated with an optical disc 190 attached thereto wherein data is stored on an optical surface 192 of the optical disc 190. The optical disc drive 400 has three basic components, a drive motor 420, an optical pickup unit 414, and an optical mechanical assembly 408. The drive motor 420 serves to spin the optical disc 190 at predetermined rates that typically vary from several hundred to several thousand rpm. The optical pickup unit 414 serves to read and write data from and to the optical surface 192 of the optical disc 190. The optical mechanical assembly 408 serves to move the optical pickup unit 414 in a radial direction 440 relative to the optical disc 190 to predetermined locations relative to the optical disc 190.

The optical pickup unit 414 typically has a laser, not shown, to illuminate the optical surface 192, an objective lens 416 to focus the laser, and a photodetector, not shown, to translate light to machine-readable data. Other optical components may be located within the optical pickup unit 414 to direct light between the photodetector and the objective lens 416. Mechanical components may be located in the optical pickup unit 414 and may serve to support the objective lens 416 and to move the objective lens 416 relative to the optical pickup unit 414.

The optical pickup unit 414 emits incident light that is directed through the objective lens 416 and to the optical surface 192 of the optical disc 190. The optical pickup unit 414 may, as an example, output approximately 20 milliwatts of coherent light having a wavelength of approximately 790 nanometers. Light is reflected from the optical surface 192 of the optical disc 190 through the objective lens 416 and back to the optical pickup unit 414. The light reflected from the optical surface 192 of the optical disc 190 varies in intensity wherein the variations are caused by light reflecting from the optical transitions on the optical surface 192 as the optical disc 190 spins. These variations in intensity are representative of the data stored on the optical surface 192.

As the optical disc 190 spins, the mechanical components in the optical pickup unit 414 move the objective lens 416 in a radial direction 440 and a normal direction 430. Specifically, the optical pickup unit 414 moves the objective lens 416 normal to the optical surface 192 of the optical disc 190 to focus light between the optical surface 192 and the optical pickup unit 414. This focusing allows a sharp image of the optical transitions on the optical surface 192 to be focused onto the photodetector, which improves the operation of the optical disc drive 400. The optical pickup unit 414 moves the objective lens 416 radially relative to the optical surface 192 of the optical disc 190 to follow the tracks on the optical disc 190 as the optical disc 190 spins. This movement of the objective lens 416 is very fine because the objective lens 416 has to follow the tracks with a tolerance of approximately one micron in the radial direction 440 as the optical disc 190 spins. The objective lens 416 is generally mounted to the optical pickup unit 414 by the use of very delicate components. This delicate mounting is required in order for the objective lens 416 to move as precisely as is required to follow the tracks on the spinning optical disc 190 and to focus the optical transitions from the spinning optical disc 190 onto the photodetector.

As described above, the objective lens 416 has to move very precise distances in very short periods in order to follow the tracks on the optical surface 192. This makes the optical pickup unit 414 a relatively delicate device. The fragile nature of the optical pickup unit 414 makes it susceptible to failure due to relatively mild shock or vibration. One cause of failure is due to the objective lens 416 becoming dislodged from the structural components in the optical pickup unit 414 that secure the objective lens 416 to the optical pickup unit. Another cause of failure is due to the components that move the objective lens 416 becoming damaged. These problems are more prevalent in optical disc drives used in portable devices because these optical disc drives are typically subjected to greater and more frequent shock and vibration.

Additional problems occur in optical disc drives that have the objective lens 416 exposed to a user when an optical disc 190 is being exchanged from the motor 420. For example, a user may inadvertently touch the objective lens 416, which may damage the optical pickup unit 414 or contaminate the surface of the objective lens 416 with oils from the user's skin. The user may also cause the optical disc 190 to contact the optical pickup unit 414, which could damage the optical pickup unit 414 or the objective lens 416. In addition, during the exchange of the optical disc 190, the optical pickup unit 414 becomes exposed to the environment and may become damaged if contaminants from the environment enter it. An exposed optical pickup unit 414 may also be dangerous to the user if the optical pickup unit 414 becomes active in the presence of a user. Laser light is typically emitted by the optical pickup unit, which is a relatively bright and narrow beam of coherent light. This light may pose health risks to the user, such as causing irreversible and permanent damage to the user's retinas.

Therefore, a need exists for a mechanism incorporated into an optical disc drive that will secure the optical pickup unit in a fixed position and out of sight and reach of a user when the optical disc drive is not in use.

SUMMARY OF THE INVENTION

An optical disc drive having a cover member movably attached thereto that secures and protects an optical pickup unit is disclosed herein. The optical disc drive is a device that spins an optical disc and "reads" data from the spinning optical disc in a similar manner as a magnetic disc drive reads data stored on a magnetic disc. Some optical disc drives are also capable of "writing" data to an optical disc. The optical pickup unit is a component of the optical disc drive that actually reads data from or writes data to the optical disc. The optical pickup unit typically emits a narrow beam of coherent light through an objective lens to illuminate the optical disc. The light may, as an example, be emitted by a laser. Light reflected from the optical disc passes through the objective lens and to a photosensing device where it is translated to machine-readable data, e.g., binary data. The optical pickup unit may move on an axis so as to read and write data on specific portions of the optical disc.

The cover member may be movably attached to the optical disc drive wherein the cover member has a first operating position and a second operating position. When the cover member is in the first operating position, it may be positioned so as not to block the light path between the optical pickup unit and an optical disc. When the cover member is in the second operating position, it may be positioned so as to block the light path between the optical pickup unit and the optical disc drive. Positioning the cover member in the second operating position is used when the optical pickup unit is likely to be exposed to a user, such as when a user is replacing the optical disc. This placement of the cover member in the second operating position may prevent a user from contacting the optical pickup unit, thus, preventing the user from damaging the optical pickup unit. This placement of the optical pickup unit may also prevent a user from being exposed to harmful laser emissions from the optical pickup unit should the optical pickup unit become active during the period that the user is exposed to the optical pickup unit.

DETAILED DESCRIPTION OF THE INVENTION

Figure 1:
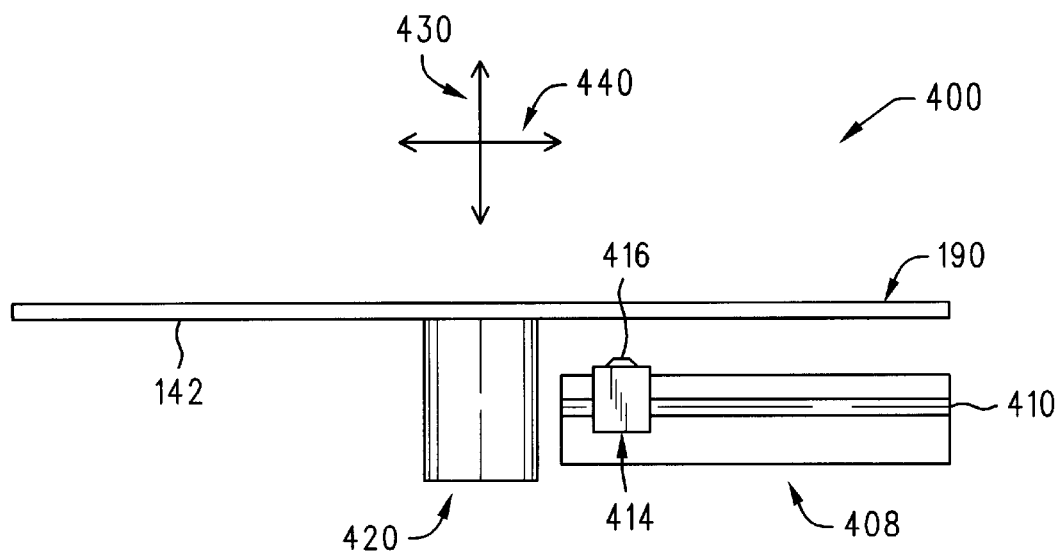
FIG. 1 is a schematic diagram of a side view of an optical disc drive.

FIGS. 2 through 6, in general, illustrate an optical disc drive 100 comprising: an optical pickup unit 250; a cover member 300 movably associated with the optical disc drive 100, the cover member 300 having a first operating position and a second operating position; wherein the optical disc drive 100 includes: a non-operative condition in which the cover member 300 is positioned at the first position, adjacent the optical pickup unit 250; and an operative condition in which the cover member 300 is positioned at a second position, spaced from the first position.

FIGS. 2 through 6 also, in general, illustrate an optical disc drive 100 comprising: a housing 110; a chassis 200 movably associated with the housing 110, the chassis 200 having a first operating position and a second operating position, wherein the chassis 200 is in the first operating position when the chassis 200 is substantially located within the housing 110, and wherein the chassis 200 is in the second operating position when the chassis 200 is not substantially located within the housing 110; a cover member 300 movably associated with the chassis 200, the cover member 300 having a first operating position and a second operating position; wherein the cover member 300 is in the cover member first operating position when the chassis 110 is in the chassis first operating position; and wherein the cover member 300 is in the cover member second operating position when the chassis 200 is in the chassis second operating position.

FIGS. 2 through 6 also, in general, illustrate a method of operation for an optical disc drive 100 of the type including a movably mounted optical pickup unit 250 therein. The method comprising: providing a cover member 300 movably associated with the optical disc drive 100; deactivating the optical disc drive 100 by moving the cover member 300 such that the optical pickup unit 250 is protected by the cover member 300; and activating the optical disc drive 100 by moving the cover member 300 such that the optical pickup unit 100 is not protected by the cover member 300.

FIGS. 2 through 6 also, in general, illustrate a method of protecting an objective lens 262 of an optical disc drive 100, wherein the objective lens 262 is movably mounted relative to the optical disc drive 100. The method comprises: providing a cover member 300 movably associated with the optical disc drive 100; and moving the cover member 300 such that the cover member 300 is adjacent the objective lens 262.

Figure 2:
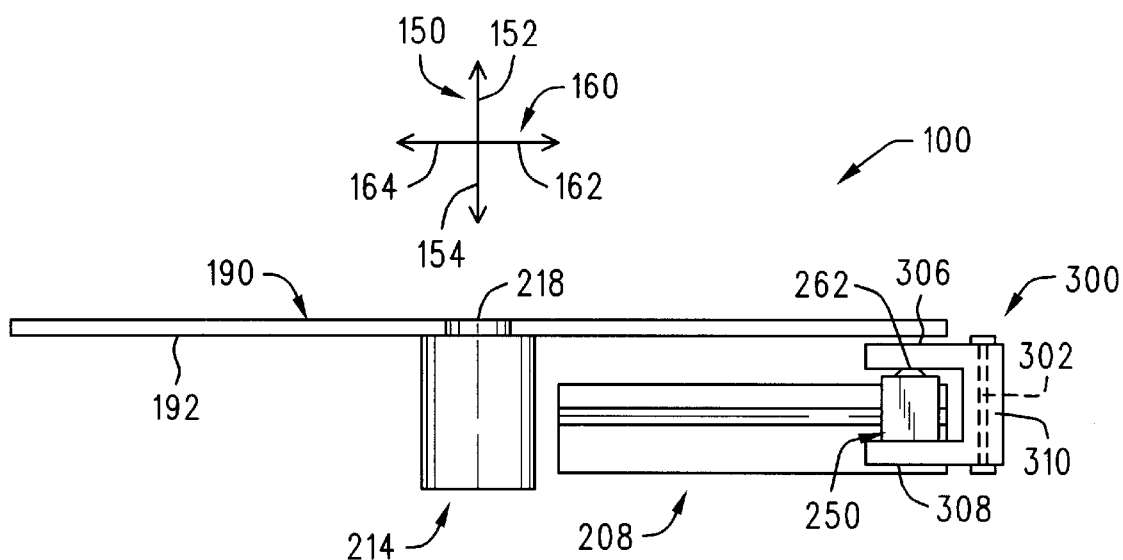
FIG. 2 is a schematic diagram of the optical disc drive of FIG. 1 with the addition of a cover member.

Having described the optical disc drive 100 and the components thereof in general, they will now be described in greater detail. A summary description of the optical disc drive 100 is followed by a more detailed description of the optical disc drive 100. Referring to FIG. 2, in summary, the optical disc drive 100 may have an optical pickup unit 250 that is used to read data from an optical disc 190. Specifically, the optical pickup unit 250 reads data stored on an optical surface 192 of the optical disc 190 as the optical disc 190 spins. The optical pickup unit 250 may emit a narrow beam of light having a very narrow wavelength that is used to illuminate the optical surface 192. The light may, as an example, be emitted by a laser. The optical pickup unit 250 receives light reflected from the optical surface 250 and translates the reflected light to machine-readable image data, thus, the optical pickup unit 250 reads the data stored on the optical disc 190.

The optical pickup unit 250 may have an objective lens 262 that moves in a normal direction 150 and a radial direction 160 while the optical pickup unit 250 is reading the data from the optical surface 192. The movement in the normal direction 150 may serve to focus an image of the optical surface 192 onto optical components located in the optical pickup unit 250. The movement in the radial direction 160 may serve to precisely follow the data stored on the optical surface 192 as the optical disc 190 spins. The objective lens 262 may only move distances in the order of microns. Thus, the mechanisms within the optical pickup unit 250 that move the objective lens 262 tend to be very delicate, making the optical pickup unit 250 a relatively delicate device.

The light emitted by the optical pickup unit 250 may pose health risks to the user. For example, the light may damage the user's retinas, which generally causes permanent and irreversible damage to the user's vision. A user is exposed to the optical pickup unit 250 when he or she exchanges the optical disc 190, however, the optical pickup unit 250 is normally deactivated when the optical disc 190 is being exchanged. If, however, the optical pickup unit 250 becomes activated for any reason while the user is exposed to the optical pickup unit 250, the light may contact the user and endanger the health of the user.

As was previously described, a user may be exposed to the optical pickup unit 250 when he or she is exchanging an optical disc 190. If the user touches the objective lens 262 or causes an object to contact the objective lens 262, the optical pickup unit 250 may be damaged. For example, oils from the user's hands may contaminate the objective lens 262, thereby making the optical pickup unit 250 unable to read the optical surface 192 of the optical disc 190. The user may also damage the mechanism that moves the objective lens 262 by directly contacting the objective lens 262 or causing an object to contact the objective lens 282, which will render the optical pickup unit optical pickup unit 250 and, thus, the optical disc drive 100 inoperable. For example, the user may inadvertently strike the objective lens 262 with the optical disc 190 when he or she is exchanging the optical disc 190. The optical disc drive 100 may also be rendered inoperable if the optical disc drive 100 is subject to excessive shock or vibration that damages the mechanism that moves the objective lens 262.

The optical disc drive 100 disclosed herein overcomes the above-described problems by the use of a cover member 300 that may serve to protect the optical pickup unit 250 when it is not in use. The cover member 300 moves to cover the optical pickup unit 250 and the objective lens 262 when a user exchanges the optical disc 190. The cover member 300 protects the user from being exposed to harmful emissions from the optical pickup unit 250 and it further protects the optical pickup unit 250 from being damaged by the user. The cover member 300 can also protect the optical pickup unit 300 from being damaged in the event the optical disc drive 100 is subject to excessive shock or vibration.

Having summarily described the optical disc drive 100 and the components thereof, they will now be described in further detail. A brief description of the optical disc drive 100 is followed by a more detailed description of the optical disc drive 100.

FIG. 2 is a side schematic illustration of the optical disc drive 100 being used with an optical disc 190. The optical disc drive 100 serves to convert data stored on an optical surface 192 of the optical disc 190 to machine-readable data (sometimes referred to simply as data or digital data). The data is stored on spiral tracks in the form of optical transitions on the optical surface 192 of the optical disc 190 in a conventional manner.

The optical disc drive 100 may have an optical pickup unit 250, an optical mechanical assembly 208, and a motor 214. The optical pickup unit 250 may serve to detect the optical transitions on the optical surface 192 of the optical disc 190. The optical mechanical assembly 208 may serve to move the optical pickup unit 250 to predetermined locations relative to the optical disc 190. The motor 214 may serve to spin the optical disc 190 at predetermined rates. In order to efficiently store data on the optical surface 192, the optical transitions are located on tracks that are typically separated by a distance of 1.6 microns. The motor 214 typically spins the optical disc 190 at speeds of up to 4000 rpm when the optical pickup unit 250 reads data from the optical surface 192. Accordingly, the optical pickup unit 250 has to precisely follow the tracks on the optical surface 192 as the optical disc 190 is spinning or the data will not be read correctly.

The optical pickup unit 250 may have optical components located therein, as are known in the art, that illuminate the optical surface 192 and detect light that reflects from the optical surface 192. The optical pickup unit 250 may, as an example, emit coherent light having a wavelength of approximately 790 nanometers and a power of approximately 20 milliwatts. The device that emits the light may, as an example, be a laser as is known in the art. An objective lens 262 may be located in the optical pickup unit 250 and may serve to focus light between the optical components located in the optical pickup unit 250 and the optical surface 192.

The optical pickup unit 250 may also have mechanical components located therein that move the objective lens 262 in a radial direction 160 and a normal direction 150. These mechanical components allow the objective lens 262 to follow the data stored in the tracks on the optical disc 190 as the optical disc 190 spins. Due to the high rate of speed of the optical disc 190 and the high concentration of tracks, the objective lens 262 has to move very precise and small amounts in very short periods in order to follow the data stored in the tracks. Thus, the mechanical components located within the optical pickup unit 250 that move the objective lens 262 tend to be very delicate.

These delicate mechanisms make the optical pickup unit 250 very susceptible to vibration and shock. Should the optical disc drive 100 be subject to excessive or frequent shock or vibration, the objective lens 262 may become dislodged from the optical pickup unit 250 or the mechanisms that connect the objective lens 262 to the optical pickup unit 250 may become damaged. The delicate nature of the optical pickup unit 250 also makes it relatively sensitive to contamination, which may occur if the optical pickup unit 250 is exposed to the environment. For example, the optical pickup unit 250 may become contaminated when a user exchanges optical discs.

The optical pickup unit 250 is also subject to failure if a user contacts the objective lens 262 while he or she is exchanging the optical disc 190. This may result in the aforementioned damage to the optical pickup unit 250. In addition, human contact with the objective lens 262 may cause it to become contaminated, which will diminish the effectiveness of the optical pickup unit 250. The user may also be subject to bodily harm if the optical pickup unit 250 becomes activated when the user is exchanging the optical disc 190. For example, laser light may be emitted from the optical pickup unit 250 and may cause damage to the user's retinas, which is both irreversible and permanent.

The optical disc drive 100 described herein overcomes the aforementioned problems by providing cover member 300 that protects the optical pickup unit 250 from the shock, vibration, and contamination. The cover member 300 also protects the user from dangerous light emitted by the optical pickup unit 250. The cover member 300 may be appropriately shaped so that it may move to cover the optical pickup unit 250 when the optical disc drive 100 is not in use. Specifically, the cover member 300 may move so as to be positioned between the optical disc 190 and the optical pickup unit 250.

Placing the cover member 300 over the optical pickup unit 250 keeps the user from contacting the objective lens 262 while protecting the user from being exposed to laser light in the event the light source in the optical pickup unit 250 becomes active. In one embodiment, the cover member 300 may be further appropriately shaped so that it secures the objective lens 262 in a fixed position when the optical pickup unit 250 is not in use. Securing the objective lens 262 in a fixed position lessens the likelihood that the optical pickup unit 250 will fail if it is subject to shock or vibration.

Having briefly described the optical disc drive 100 with the cover member 300 incorporated therein, the optical disc drive 100 will now be described in greater detail including other components that are used by the optical disc drive 100. Except for the addition of the cover member 300, the optical disc drive 100 may be similar to optical disc drives as are known in the art.

Figure 3:
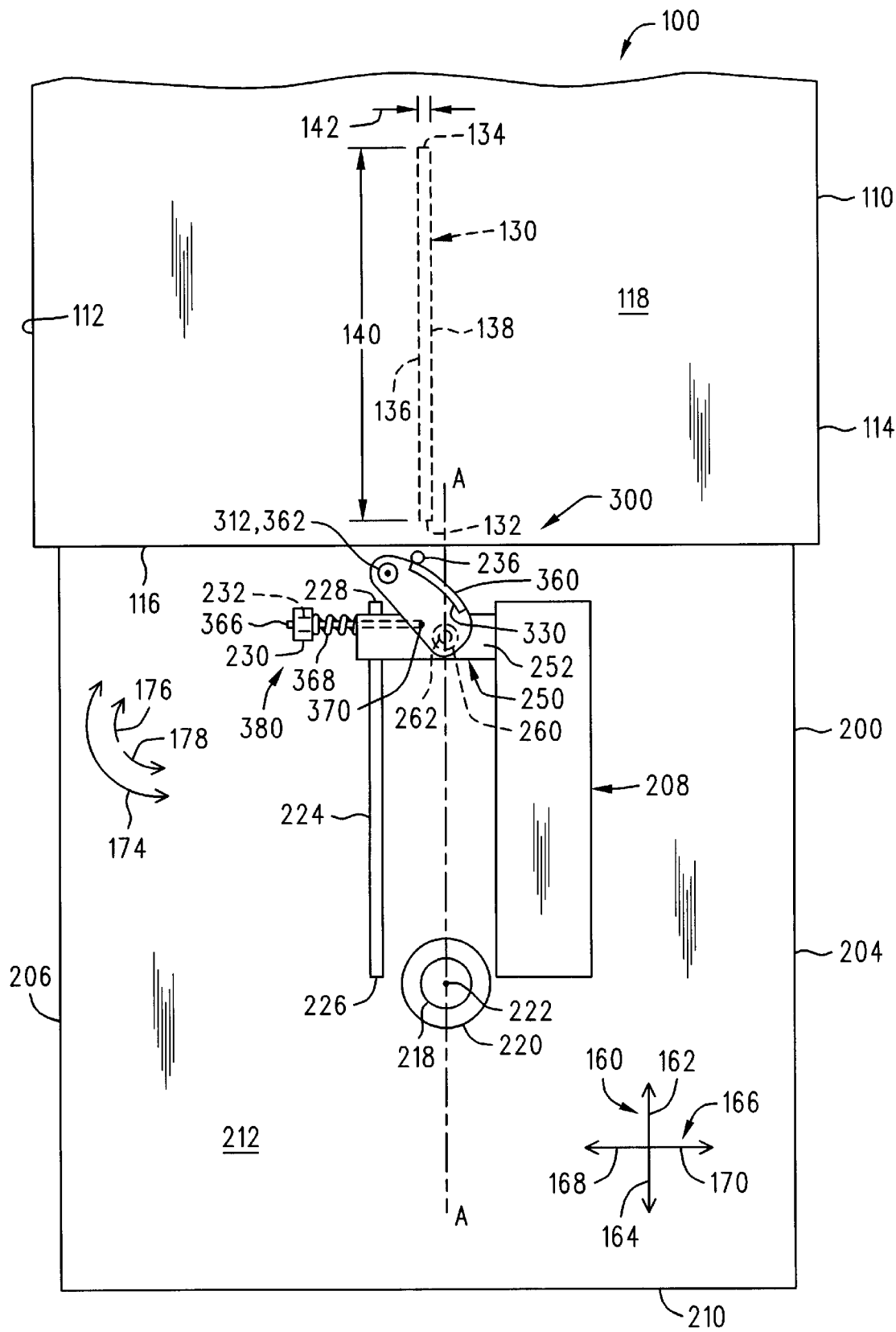
FIG. 3 is a top view of the optical disc drive of FIG. 2 including a tray assembly wherein the tray assembly is extended from a housing of the optical disc drive.

FIG. 3 is a top view of the optical disc drive 100. The optical disc drive 100 may have a housing 110 having a left portion 112, a front portion 116, a right portion 114, and a top portion 118. The housing 110 may also have a back portion that is not illustrated in FIG. 3. The top portion 118 may have a rail 130 affixed to the underside. The rail 130 may have a front portion 132, a back portion 134, a left portion 136, and a right portion 138. The rail 130 may have a length 140 extending between the front portion 132 and the back portion 134. The rail 130 may also have width 142 extending between the left portion 136 and the right portion 138.

A tray assembly 200 (sometimes referred to herein as a chassis) may be movably associated with the housing 110. Specifically, the tray assembly 200 may slide into and out of the front portion 116 of the housing 110. The tray assembly 200 may have a left portion 206, a right portion 204, and a front portion 210. The tray assembly 200 may also have a back portion that is not illustrated herein. The left portion 206, right portion 204, and front portion 210 may form the boundaries of a surface 212. The surface 212 may serve to support components comprising the optical disc drive 100. Conventional guide assemblies, not shown, may be used to movably attach the tray assembly to the housing 110.

A hub 220 may extend through the surface 212 of the tray assembly 200. The hub 220 may be attached to the motor 214 illustrated in FIG. 2. The hub 220 may also be attached to a spindle 218 wherein the center point of the spindle is referred to herein as a rotation point 222. The hub 220 may serve to hold an optical disc on a plane as the motor 214, FIG. 2, spins the optical disc. The spindle 218 may serve to center the optical disc on the hub 220 so as to keep the spinning optical disc from wobbling.

Figure 4:
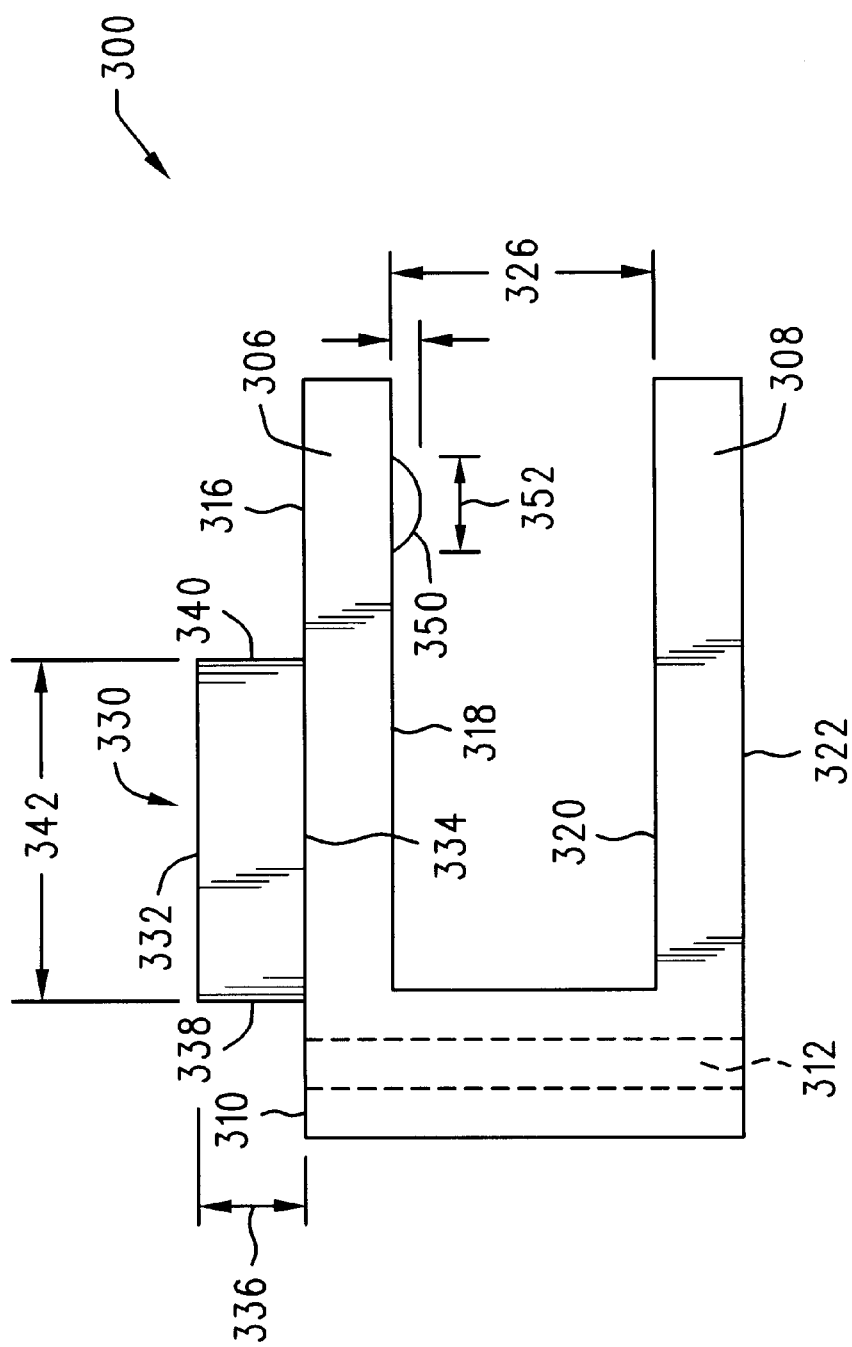
FIG. 4 is a side view of the cover member of FIG. 3.

The optical pickup unit 250 may be movably mounted to the tray assembly 200. The optical pickup unit 250 is better illustrated in FIG. 6, which is a view of the tray assembly 200 located in the housing 110. As will be described below, the cover member 300 illustrated in FIG. 4 is not blocking the view of the optical pickup unit 250 as it is in FIG. 3.

The optical pickup unit 250 may have top portion 252 (sometimes referred to herein as a surface) that is located on a plane that is approximately parallel to a plane defined by the surface 212. The top portion 252 may have an opening 260. An objective lens 262 may be located in the proximity of the opening 260. The objective lens 262 may be located in one of three locations relative to the top portion 252: below the top portion 252, flush with the top portion 252, or extending above the top portion 252. In the example described herein, the objective lens 262 is illustrated as being located below the top portion 252.

Figure 5:
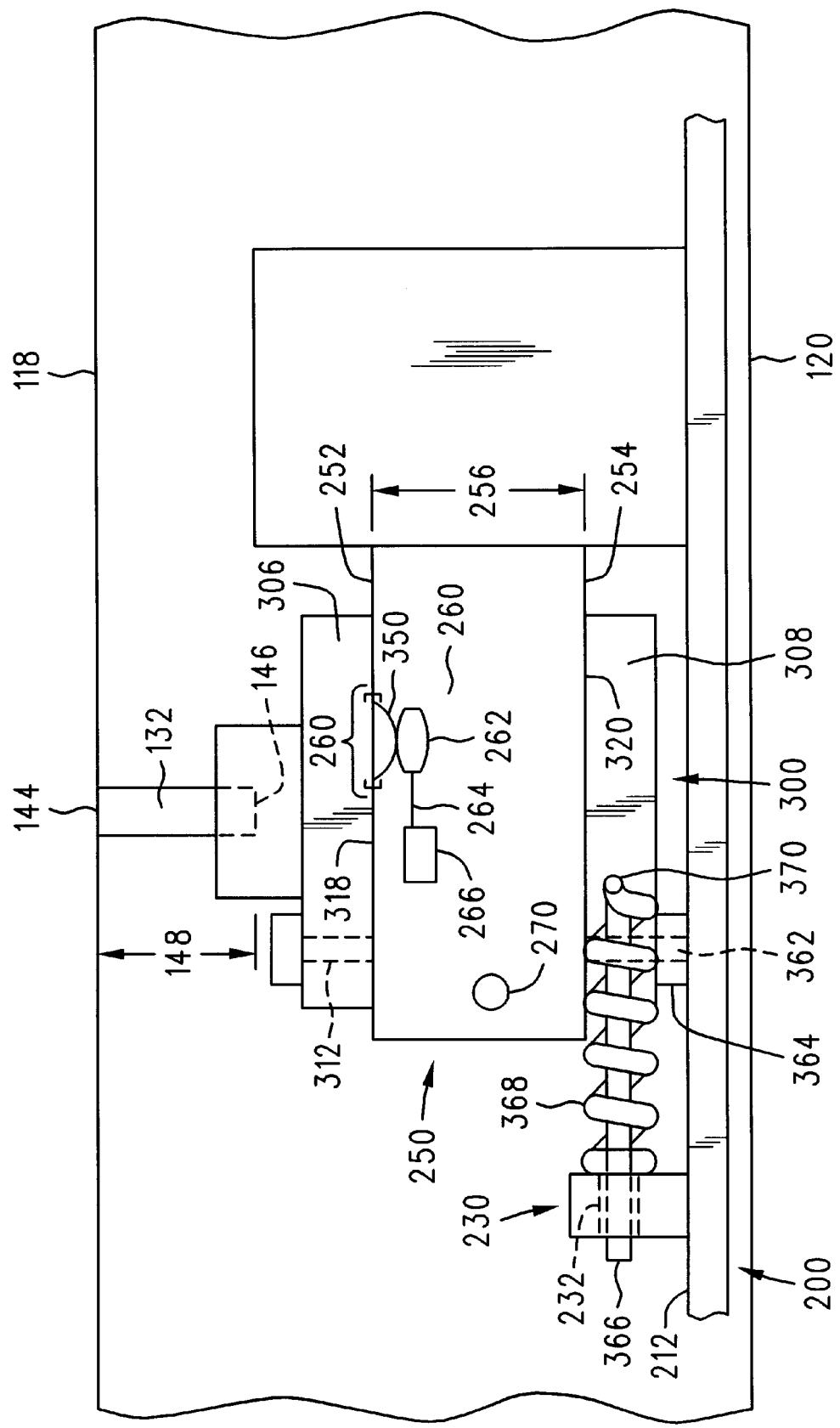
FIG. 5 is a front side view of the optical disc drive of FIG. 3.

Referring briefly to FIG. 5, which is a side view of the optical disc drive 100 of FIG. 3, a lever mechanism 264 may attach the objective lens 262 to a control mechanism 266 located within the optical pickup unit 250. The combination of the lever mechanism 264 and the control mechanism 266 are often referred to as a magnetic actuator and may serve to move the objective lens 262 relative to the optical pickup unit 250 as is known in the art. The lever mechanism 264 is illustrated herein as being a single unit. It is to be understood, however, that the lever mechanism 264 may comprise a plurality of wires that attach the objective lens 262 to the control mechanism 266 as is known in the art. In addition to the top portion 252, the optical pickup unit 250 may also have a bottom portion 254. The top portion 252 may be separated from the bottom portion 254 by a distance 256. The optical pickup unit 250 may also have a hole 270, which, in conjunction with other components, may serve to guide the optical pickup unit 250 relative to the tray assembly 200.

Figure 6:
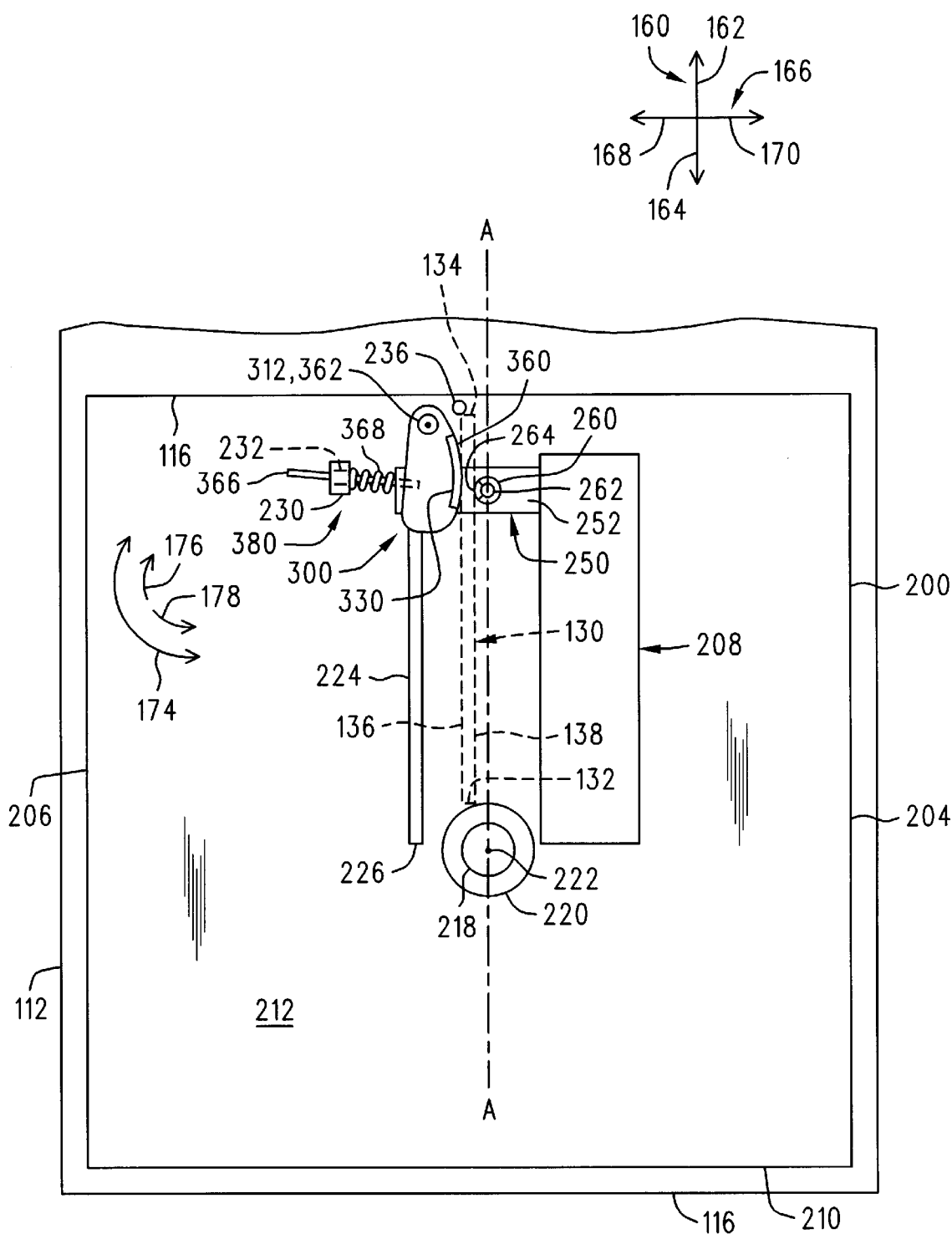
FIG. 6 is a top view of the optical disc drive of FIG. 3 with the tray assembly located within the housing.

Referring again to FIG. 6, the optical pickup unit 250 may have other conventional optical components, not shown, that convert light to machine-readable data (sometimes referred to herein simply as data or digital data) as are known in the art. As briefly described above, the optical pickup unit 250 may be movable relative to the tray assembly 200. Specifically, the optical pickup unit 250 may be movable relative to the tray assembly 200 along an axis defined by the reference line AA that extends through the rotation point 222 and the center of the objective lens 262. The reference line AA in FIG. 6 is parallel to the radial direction 160. It is to be understood, however, that the optical pickup unit 250 may move in a non-radial direction relative to the tray assembly 200.

Referring again to FIG. 3, an optical mechanical assembly 208 may be affixed to the surface 212 of the tray assembly 200 A portion of the optical mechanical assembly 208 may be attached to the optical pickup unit 250 in a conventional manner. The optical mechanical assembly 208 may serve to move the optical pickup unit 250 in a radial direction 160, consisting of a positive radial direction 162 and a negative radial direction 164. A rail 224 may also be affixed to the surface 212. The rail 224 may have a front end 226 and a back end 228. The rail 224 may pass through the hole 270, FIG. 5, in the optical pickup unit 250 and may serve to guide the optical pickup unit 250 as it is moved by the optical mechanical assembly 208. The rail 224 may also support the optical pickup unit 250 so it does not tilt relative to the surface 212. The optical disc drive 100 is illustrated herein having a single rail 224 that guides and supports the optical pickup unit 250. Some other optical disc drives use a plurality of rails to guide and support the optical pickup unit.

A cover member 300 may be pivotally attached to the surface 212. An embodiment of the cover member 300 is illustrated in detail in FIG. 4, which is a side view of the cover member 300 illustrated in FIGS. 3 and 6. The cover member 300 may be a c-shaped device having an upper portion 306, a lower portion 308, and a pivot portion 310. The pivot portion 310 may have a hole 312 that may serve to pivotally attach the cover member 300 to the surface 212, FIG. 3. The upper portion 306 may have a top side 316 and a bottom side 318. The lower portion 308 may also have a top side 320 and a bottom side 322. The bottom side 318 of the upper portion 306 may be separated from the top side 320 of the lower portion 308 by a distance 326. The distance 326 may be substantially equivalent to the distance 256 of FIG. 5 between the top portion 252 and the bottom portion 254 of the optical pickup unit 250. A cushion material 350 may extend a distance 354 from the bottom side 318 of the upper portion 306. The cushion material 350 may have a width 352 that is substantially equivalent to the size of the opening 260, FIG. 5. The cushion material 350 may serve to contact the objective lens 262, FIG. 5, so as to secure the objective lens 262 in a fixed position.

Referring again to FIG. 4, a tab 330 may be attached to the top side 316 of the upper portion 306. The tab 330 may have a top side 332, a bottom side 334, a left side 338, and a right side 340. A height 336 may extend between the top side 332 and the bottom side 334. A width 342 may extend between the left side 338 and the right side 340. Referring again to FIG. 3, the tab 330 may serve to contact the rail 130 and may be appropriately sized to do so. Specifically, an engagement portion 360 of the tab 330 may actually contact the rail 130.

Referring briefly to FIG. 5, the cover member 300 may be pivotally attached to the surface 212 by the use of a pin 362. The pin 362 may pass through the hole 312 in the pivotal portion 310 of the cover member 300 and into the surface 212 of the tray assembly 200. The pin 362 may also pass through a spacer 364 located between the lower portion 308 of the cover member 300 and the surface 212. The spacer 364 may serve to keep the lower portion 308 from contacting the surface 212, which allows the cover member 300 to move unencumbered. Referring again to FIG. 3, the cover member 300 may move in a rotational direction 174 that is centered about the hole 312. The rotational direction 174 may consist of a positive rotational direction 176 and a negative rotational direction 178.

A spring mechanism 380 may be attached between the cover member 300 and the surface 212. The spring mechanism 380 may have a securing block 230, a guide pin 366, and a spring 368. The securing block 230 may have a hole 232 through which the guide pin 366 passes. The guide pin 366 may pivotally attach to the lower portion 308, FIG. 5, of the cover member 300 at an attaching point 370. The guide pin 366 may also pass through the spring 368. The spring 368 may extend between the securing block 230 and the lower portion 308 of the cover member 300 and may serve to bias the cover member 300 in the negative rotational direction 178, FIG. 3, so as to be in the position illustrated in FIG. 3.

A post 236 may extend normal from the surface 212 of the tray assembly 200. The post 236 may extend high enough to contact the cover member 300 and, thus, may serve to limit the movement of the cover member 300 in the negative rotational direction 178.

Having described the optical disc drive 100 incorporating the cover member 300, the operation of the optical disc drive 100 incorporating the optical cover member 300 will now be described.

The optical disc drive 100 is illustrated in FIG. 3 with the tray assembly 200 extended from the housing 110 of the optical disc drive 100. In this position, a user may exchange an optical disc, not shown, on the hub 220. In a conventional optical disc drive the user may be exposed to harmful laser emissions from the optical pickup unit 250 if the optical pickup unit 250 becomes active. In addition, in a conventional optical disc drive, the optical pickup unit 250 is exposed to contaminants from the environment.

The optical disc drive 100 overcomes these and the above-described problems by the use of the cover member 300. Prior to the tray assembly 200 being extended from the housing 110, the optical disc drive 100 instructs the optical mechanical assembly 208 to move the optical pickup unit 250 in the positive y-direction 162 to the proximity of the cover member 300. This position of the optical pickup unit 250 is sometimes referred to herein as the second operating position of the optical pickup unit 250 or a non-operative condition of the optical disc drive 100.

The spring 368 in the spring mechanism 380 causes the cover member 300 to pivot in the negative rotational direction 178 to where the cover member 300 contacts the post 236. The guide pin 366 assures that the spring 368 remains in position between the securing block 230 and the cover member 300.

FIG. 5 illustrates the cover member 300 in relation to the optical pickup unit 250. The bottom side 318 of the upper portion 306 of the cover member 300 is contacting the top portion 252 of the optical pickup unit 250. Likewise, the top side 320 of the lower portion 308 of the cover member 300 is contacting lower portion 254 of the optical pickup unit 250. The optical pickup unit 250 is, thus, secured in a fixed position by the cover member 250. Alternatively, the top portion 306 and the lower portion 308 of the cover member 300 may be adjacent to the top portion 252 and the bottom portion 254 of the optical pickup unit 250. The optical pickup unit 250 will, thus, only be covered by the cover member 300.

The objective lens 262 is illustrated as being positioned below the top portion 252 of the optical pickup unit 250. The cushion material 350 extends from the bottom side 318 of the upper portion 306 of the cover member 300 through the opening 260 in the top portion 252 of the optical pickup unit 250 to contact the objective lens 262. The cushion material 350 secures the objective lens 262 in a fixed position relative to the optical pickup unit 250 without scratching or contaminating the objective lens 262. This lessens the likelihood that the lever mechanism 264 or the control mechanism 266 (collectively referred to as the magnetic actuator) will become damaged should the optical disc drive 100 be subjected to shock or vibration.

Referring again to FIG. 3, the cover member 300 covers the optical pickup unit 250 including the objective lens 262. Accordingly, a user is unable to contact the objective lens 262 and, thus, cannot damage the objective lens 262 or the mechanical components to which the objective lens 262 is attached. Likewise, a user cannot contaminate the objective lens 262 by transferring oils from the user's skin onto the objective lens 262. The cover member 300 also serves the function of protecting the user from being exposed to light emitted by the optical pickup unit 250. Should the optical pickup unit 250 become active while the optical pickup unit 250 is exposed to the user, the light emitted by the optical pickup unit 250 will be absorbed by the cover member 300 and will not contact the user.

The lower portion 308, FIG. 5, of the cover member 300 may be appropriately sized so that it may fit between the optical pickup unit 250 and an optical disc. Thus, the optical pickup unit 250 does not have to travel greater than the distance traveled in a conventional optical disc drive for the cover member 300 to function. Accordingly, the mechanical components comprising the optical disc drive 100 need only minimal, if any, modifications to accommodate the cover member 300.

When the cover member 300 is positioned above the optical pickup unit 250, it prevents the optical pickup unit 250 from being able to read an optical disc. Therefore, the cover member 250 needs to be moved away from the optical pickup unit 250 when the optical pickup unit 250 operates to read an optical disc. As described below, the cover member 300 is moved away from the optical pickup unit 250 when the tray assembly 200 is inserted into the housing 110 as illustrated in FIG. 6. FIG. 6 is simply a view of the optical disc drive 100 of FIG. 3 with the tray assembly located in the housing 110. When the tray assembly 200 is located in the housing 110, the optical disc drive 100 is sometimes referred to as being in an operative condition. When the cover member 300 is positioned away from the optical pickup unit 250, the cover member is sometimes referred to as being in a first operating position.

Referring to FIGS. 3 and 6, when the optical pickup unit 250 is required to read information from an optical disc, not shown, the optical disc is placed on the spindle 218 and the hub 220. The tray assembly 200 is then inserted into the housing 110 as illustrated in FIG. 6. As the tray assembly 200 is inserted into the housing 110, the engagement portion 360 of the tab 330 contacts the front portion 132 of the rail 130. This causes the cover member 300 to pivot on the pin 362 in the positive rotational direction 176. As the cover member 300 pivots, the spring 368 is compressed, the guide pin 366 passes through the hole 232 in the securing block 230, and the cover member 300 moves away from the objective lens 262. The engagement portion 360 of the tab 330 slides along the left portion 136 of the rail 130 as the tray assembly 200 is slid into the housing 110. The rail 130 is long enough to retain the cover member 300 away from the objective lens 262 even with the tray assembly 200 completely located within the housing 110.

The cover member 300 is, thus, located a distance from the objective lens 262. The optical pickup unit 250 may then read data stored on an optical disc in a conventional manner. When the tray 200 is in the housing 110 illustrated in FIG. 6, the housing 110 will prevent the user from being able to contact and, thus, damage the optical pickup unit 250. Likewise, light may be emitted from the optical pickup unit 250 without the risk of exposing a user to the light.

When the tray assembly 200 is located in the housing 110 as illustrated in FIG. 6, the optical disc drive is sometimes referred to as being in an operative condition. When the cover member 300 is located a distance from the objective lens 262 as illustrated in FIG. 6, the cover member is sometimes referred to as being in a first operating position.

Referring to FIG. 5, the optical pickup unit 250 has been described herein with the objective lens 262 recessed below the surface 252 of the optical pickup unit 250. In some optical pickup units, the objective lens 262 may be flush with the surface 252 or extend slightly from the surface 252. An optical disc drive using either of these optical pickup units use different embodiments of the cover member 300. For example, instead of having the cushion material 350 extend beyond the bottom side 318 of the lower portion 308, the cushion material may be recessed into the bottom side 318.

The cover member 300 disclosed herein may be applicable to other types of optical disc drives. For example, in some optical disc drives, access to an optical disc is gained by opening an access cover rather than by sliding the tray assembly 200 from the housing 110 as illustrated herein. In these optical disc drives, the access cover typically pivots on a housing. The cover member 300 may, as an example, be moved to cover an objective lens in these optical disc drives by attaching an arm member to the access cover. As the access cover is opened, the arm member may contact the cover member 300 and move it to a position similar to that illustrated in FIG. 3 where it protects the optical pickup unit.

Other methods of moving the cover member may also be applicable. For example, a light sensor or switch may be associated with the access cover or tray assembly wherein an electronic signal is generated when the access cover or tray assembly is opened. The electric signal may cause the cover member to move by way of a magnetic actuator or a motor, e.g., a servo motor, to cover the optical pickup unit as described herein.

Referring to FIGS. 4 and 5, an embodiment of the cover member 300 does not have the lower portion 308. In this embodiment, the cover member 300 serves solely to cover the optical pickup unit 250 rather than serving the dual function of covering and securing the optical pickup unit 250. This embodiment may be used in optical disc drives where there is not enough room for the lower portion 308 to fit between optical pickup unit 250 and the surface 212 of the tray assembly 200.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. An optical disc drive comprising:

a housing;

a chassis comprising an optical pickup unit movably associated relative to said housing, said chassis having a first operating position and a second operating position, wherein said chassis is in said first operating position when said chassis is substantially located within said housing, and wherein said chassis is in said second operating position when said chassis is not substantially located within said housing;

a cover member movably associated with said chassis, said cover member having a first operating position and a second operating position;

wherein said chassis being in said first operating position causes said cover member to be in said first operating position; and wherein said chassis being in said second operating position causes said cover member to be in said second operating position.

2. The optical disc drive of claim 1, wherein said optical pickup unit is movably associated with said chassis along an axis, wherein said axis intersects said cover member when said cover member is in said second operating position.

3. The optical disc drive of claim 2 wherein said optical pickup unit has a first operating position and a second operating position wherein said optical pickup unit is in said second operating position when said optical pickup unit is positioned proximate to said cover member and wherein said optical pickup unit is in said first operating position when said optical pickup unit is not located proximate said cover member.

4. The optical disc drive of claim 1 further comprising a detent mechanism operationally associated between said chassis and said cover member.

5. The optical disc drive of claim 4 wherein said detent mechanism biases said cover member in said second operating position.

6. A method of operation for an optical disc drive of the type including a housing, a chassis movable between a position substantially within said housing and a position not substantially within said housing, and a movable optical pickup unit mounted to said chassis, said method comprising:

provide a cover member movably associated relative to said optical disc drive;

deactivating said optical disc drive by moving said chassis from a position substantially within said housing to a position not substantially within said housing, wherein said moving causes said optical pickup unit to be protected by said cover member; and activating said optical disc drive by moving said chassis from a position not substantially within said housing to a position substantially within said housing, wherein said moving causes said optical pickup unit not to be protected by said cover member.

7. The method of claim 6 wherein said deactivating comprises deactivating said optical disc drive by moving said chassis from a position substantially within said housing to a position not substantially within said housing, wherein said moving causes said cover member to protect said optical pickup unit.

8. The method of claim 6 wherein:

said providing a cover member comprises providing a cover member pivotally associated with said optical disc drive;

said deactivating comprises deactivating said optical disc drive by moving said chassis from a position substantially within said housing to a position not substantially within said housing, wherein said moving causes said cover member to pivot such that said optical pickup unit is protected by said cover member; and said activating comprises activating said optical disc drive by moving said chassis from a position substantially within said housing to a position not substantially within said housing, wherein said moving causes said cover member to pivot such that said optical pickup unit is not protected by said cover member.

9. The method of claim 6 wherein said deactivating includes contacting said optical pickup unit with said cover member.

10. An optical disc drive comprising:

a housing;

a rail affixed to said housing;

a chassis movably associated with said housing, said chassis having a chassis first operating position and a chassis second operating position, wherein said chassis is in said chassis first operating position when said chassis is substantially located within said housing, and wherein said chassis is in said chassis second operating position when said chassis is not substantially located within said housing;

a cover member movably associated with said chassis, said cover member having a first operating position and a second operating position;

wherein said chassis being in said chassis first operating position causes said cover member to contact said rail, said contact with said rail causing said first cover member to be in said first operating position; and wherein said chassis being in said chassis second operating position causes said cover member not to contact said rail, said cover member not contacting said rail causing said cover member to be in said second operating position.

11. The optical disc drive of claim 10 and further comprising a detent mechanism operatively connected between said cover member and said chassis, said detent mechanism biasing said cover member toward said second operating position.

* * * * *